United States Patent
Singh et al.

(10) Patent No.: US 9,215,638 B2
(45) Date of Patent: Dec. 15, 2015

(54) METHOD AND SYSTEM FOR REGULATING FREQUENT CELL RESELECTIONS BY IDLE-MODE MOBILE DEVICES

(71) Applicant: QUALCOMM Incorporated, San Diego, CA (US)

(72) Inventors: Damanjit Singh, San Diego, CA (US); Peerapol Tinnakornsrisuphap, San Diego, CA (US); Mehmet Yavuz, San Diego, CA (US); Christophe Chevallier, San Diego, CA (US)

(73) Assignee: QUALCOMM Incorporated, San Diego, CA (US)

( * ) Notice: Subject to any disclaimer, the term of this patent is extended or adjusted under 35 U.S.C. 154(b) by 0 days.

(21) Appl. No.: 13/773,563

(22) Filed: Feb. 21, 2013

(65) Prior Publication Data
US 2013/0225172 A1    Aug. 29, 2013

Related U.S. Application Data

(60) Provisional application No. 61/603,141, filed on Feb. 24, 2012.

(51) Int. Cl.
*H04W 24/00* (2009.01)
*H04W 36/24* (2009.01)
(Continued)

(52) U.S. Cl.
CPC ............ *H04W 36/245* (2013.01); *H04W 36/16* (2013.01); *H04W 36/165* (2013.01); *H04W 36/26* (2013.01); *H04W 36/32* (2013.01); *H04W 36/04* (2013.01); *H04W 84/045* (2013.01)

(58) Field of Classification Search
CPC ..... H04W 48/16; H04W 8/183; H04W 60/00; H04W 36/30; H04W 36/04; H04W 36/18; H04W 36/32; H04W 36/245; H04W 36/24; H04W 36/08; H04W 36/14; H04W 36/16; H04W 36/165; H04W 36/34
USPC ............ 455/432.1, 434, 435.1, 435.2, 435.3, 455/436–444; 370/328, 331, 332, 338
See application file for complete search history.

(56) References Cited

U.S. PATENT DOCUMENTS

| 8,219,094 B2 | 7/2012 | Huber et al. |
| 8,717,987 B2 * | 5/2014 | Das .................. H04W 48/14 370/329 |

(Continued)

FOREIGN PATENT DOCUMENTS

| EP | 2117250 A1 | 11/2009 |
| EP | 2387279 A1 | 11/2011 |

(Continued)

OTHER PUBLICATIONS

Alcatel-Lucent et al: "On UE-speed-based methods for improving the mobility performance in HetNets", 3GPP Draft; R2-120652-Speed Based Methods for Improving Mobility Performance in Hetnet, 3rd Generation Partnership Project (3GPP), Mobile Competence Centre; 650, Route Des Lucioles; F-06921 Sophia-Antipolis Cedex; France, RAN WG2, Dresden, Germany; 20120206-20120210, Jan. 31, 2012, XP050565503, [retrieved on Jan. 31, 2012].

(Continued)

*Primary Examiner* — Magdi Elhag

(57) ABSTRACT

Disclosed are systems and methods for regulating system reselections by idle-mode mobile devices. In one aspect, a femtocell may be configured to reduce frequency of its reselection beacon, which reduces probability that a fast moving mobile device will detect the reselection beacon and reselect to that femtocell. This aspect may also delay femtocell reselection for slow moving mobile devices. In another aspect, a macrocell may slow down system reselection by adjusting cell reselection parameters used by mobile devices to determine the time needed to evaluate cell reselection criteria. Yet in another aspect, a macrocell may instruct a collocated femtocell to decrease its effective coverage area to avoid premature reselection by fast moving mobile devices. Yet in another aspect, a femtocell may use power boosting techniques to increase its reselection radius.

8 Claims, 12 Drawing Sheets

(51) Int. Cl.
*H04W 36/16* (2009.01)
*H04W 36/26* (2009.01)
*H04W 36/32* (2009.01)
*H04W 36/04* (2009.01)
*H04W 84/04* (2009.01)

(56) References Cited

U.S. PATENT DOCUMENTS

| | | | |
|---|---|---|---|
| 8,843,131 B2* | 9/2014 | Patel et al. | 455/435.1 |
| 2006/0094423 A1 | 5/2006 | Sharma et al. | |
| 2006/0182060 A1 | 8/2006 | Lin et al. | |
| 2008/0305835 A1 | 12/2008 | Johnstone et al. | |
| 2009/0005043 A1* | 1/2009 | Claussen | H04W 24/02 455/436 |
| 2009/0275334 A1 | 11/2009 | Xie et al. | |
| 2010/0027510 A1 | 2/2010 | Balasubramanian et al. | |
| 2010/0054219 A1* | 3/2010 | Humblet | H04W 48/12 370/338 |
| 2010/0203890 A1 | 8/2010 | Nagaraja et al. | |
| 2010/0220597 A1 | 9/2010 | Ji et al. | |
| 2010/0232389 A1 | 9/2010 | Park | |
| 2010/0240368 A1 | 9/2010 | Fox et al. | |
| 2010/0273487 A1 | 10/2010 | Alonso-Rubio et al. | |
| 2010/0304745 A1 | 12/2010 | Patel et al. | |
| 2010/0331000 A1 | 12/2010 | Zhu et al. | |
| 2011/0026492 A1 | 2/2011 | Frenger et al. | |
| 2011/0092151 A1* | 4/2011 | Brisebois et al. | 455/1 |
| 2011/0177808 A1 | 7/2011 | Grokop et al. | |
| 2011/0250891 A1 | 10/2011 | Zou et al. | |
| 2011/0263260 A1 | 10/2011 | Yavuz et al. | |
| 2011/0300863 A1 | 12/2011 | Iwata | |
| 2012/0088507 A1 | 4/2012 | Legg et al. | |
| 2012/0115423 A1 | 5/2012 | Sang et al. | |
| 2012/0115488 A1 | 5/2012 | Jiang et al. | |
| 2012/0129530 A1 | 5/2012 | Larmo et al. | |
| 2012/0178450 A1 | 7/2012 | Kuru et al. | |
| 2012/0182965 A1* | 7/2012 | Das | H04W 48/14 370/331 |
| 2012/0214489 A1 | 8/2012 | Koo et al. | |
| 2012/0309356 A1 | 12/2012 | Tan et al. | |
| 2013/0115949 A1 | 5/2013 | Centonza et al. | |
| 2013/0225171 A1 | 8/2013 | Singh et al. | |
| 2013/0225182 A1 | 8/2013 | Singh et al. | |
| 2013/0273919 A1 | 10/2013 | Sashihara et al. | |
| 2013/0310044 A1 | 11/2013 | Rakos | |
| 2014/0200004 A1 | 7/2014 | Wegmann et al. | |

FOREIGN PATENT DOCUMENTS

| | | |
|---|---|---|
| JP | 2004088695 A | 3/2004 |
| WO | 2008020280 A1 | 2/2008 |
| WO | 2011048410 A1 | 4/2011 |
| WO | 2011140523 A1 | 11/2011 |

OTHER PUBLICATIONS

International Search Report and Written Opinion—PCT/US2013/027516-ISA/EPO—Jul. 8, 2013.

MEDIATEK INC: "Discussion on short stay problem," 3GPP Draft; R3-12879_Discussion on Short Stay Problem, 3rd Generation Partnership Project (3GPP), Mobile Competence Centre; 650, Rout Des Lucioles; F-06921 Sophia-Antipolis Cedex; France, RAN WG3, San Francisco, USA; 20111114-20111118, Nov. 5, 2011, XP050566220, [retrieved on Nov. 5, 2011].

Nokia Siemens Networks et al: "UE MSE and HetNet Mobility", 3GPP Draft; R2-120524JV1SE and Hetnet Moblity, 3rd Generation Partnership Project (3GPP), Mobile Competence Centre; 650, Route Des Lucioles; F-06921 Sophia-Antipolis Cedex; France, RAN WG2, Dresden, Germany; 20120206-20120210, Jan. 31, 2012, XP050565427, [retrieved on Jan. 31, 2012].

Partial International Search Report—PCT/US2013/027516—ISA/EPO—May 22, 2013.

ZTE, "Identify Mobility States of a UE based on UE History Information," 3GPP TSG RAN WG3 #65bis, R3-092295, Miyazaki, Japan, Oct. 12-15, 2009, pp. 1-2.

3GPP TS 25.413: "3rd Generation Partnership Project; Technical Specification Group Radio Access Network; UTRAN Iu interface Radio Access Network Application Part (RANAP) signalling (Release 9)", V9.1.0, Dec. 2009, pp. 1-401.

3GPP TS 36.413: "3rd Generation Partnership Project; Technical Specification Group Radio Access Network; Evolved Universal Terrestrial Radio Access Network (E-UTRAN); S1 Application Protocol (S1AP) (Release 10)", V10.3.0 (Sep. 2011), pp. 1-254. See UE History Information Section 9.2.1.43.

Renesas Electronics Europe Ltd: "Improvements to Mobility State Estimation Procedure", 3GPP Draft; R2-120350 Improvements to MSE Procedure, 3rd Generation Partnership Project (3GPP), Mobile Competence Centre; 650, Route des Lucioles ; F-06921 Sophia-Antipolis Cedex ; France, vol. RAN WG2, no. Dresden, Germany; 20120206-20120210, Jan. 31, 2012, XP050565376, [retrieved on Jan. 31, 2012] Background; p. 1, paragraph 2 Signaling UE MSE state to network on RRC_Conncected transition; p. 5, paragraph 4.3 Indicating different HO margins for different MSE states in RRC_Connected; p. 5, paragraph 4.4—p. 6.

Taiwan Search Report—TW102106434—TIPO—Nov. 5, 2014.

* cited by examiner

METHOD AND SYSTEM FOR REGULATING FREQUENT CELL RESELECTIONS BY IDLE-MODE MOBILE DEVICES

CLAIM OF PRIORITY UNDER 35 U.S.C. §119

The present Application for Patent claims priority to Provisional Application No. 61/603,141 filed on Feb. 24, 2012, and assigned to the assignee hereof and hereby expressly incorporated by reference herein.

REFERENCE TO CO-PENDING APPLICATION FOR PATENT

The present Application for Patent is related to co-pending U.S. Patent Application entitled "METHOD AND SYSTEM FOR JOINT PARAMETER OPTIMIZATION FOR MACRO AND FEMTO CELLS," filed concurrently herewith, assigned to the assignee hereof, and expressly incorporated by reference herein.

BACKGROUND

1. Field

This disclosure relates generally to the field of communications and more specifically to the system and methods for regulating frequent cell reselections by idle-mode mobile devices.

2. Background

Wireless communication systems are widely deployed to provide various types of communication content such as, for example, voice, data, and so on. Typical wireless communication systems may be multiple-access systems capable of supporting communication with multiple users by sharing available system resources (e.g., bandwidth, transmit power, etc.). Examples of such multiple-access systems may include code division multiple access (CDMA) systems, time division multiple access (TDMA) systems, frequency division multiple access (FDMA) systems, orthogonal frequency division multiple access (OFDMA) systems, and the like. Additionally, the systems can conform to specifications such as third generation partnership project (3GPP), 3GPP long term evolution (LTE), ultra mobile broadband (UMB), evolution data optimized (EV-DO), etc.

Generally, wireless multiple-access communication systems may simultaneously support communication for multiple mobile devices. Each mobile device may communicate with one or more base stations (e.g., which can be commonly referred as macrocells) via transmissions on forward and reverse links. The forward link (or downlink) refers to the communication link from base stations to mobile devices, and the reverse link (or uplink) refers to the communication link from mobile devices to base stations. Further, communications between mobile devices and base stations may be established via single-input single-output (SISO) systems, multiple-input single-output (MISO) systems, multiple-input multiple-output (MIMO) systems, and so forth. In addition, mobile devices can communicate with other mobile devices (and/or base stations with other base stations) in peer-to-peer wireless network configurations.

To supplement conventional base stations (e.g., macrocells), additional low power base stations can be deployed to provide more robust wireless coverage to mobile devices. For example, low power base stations (e.g., which can be commonly referred to as Home NodeBs or Home eNBs, collectively referred to as H(e)NBs, femto nodes, femtocell nodes, pico nodes, micro nodes, etc.) can be deployed for incremental capacity growth, richer user experience, in-building or other specific geographic coverage, and/or the like. In some configurations, such low power base stations are connected to the Internet via broadband connection (e.g., digital subscriber line (DSL) router, cable or other modem, etc.), which can provide the backhaul link to the mobile operator's network. In this regard, low power base stations are often deployed in homes, offices, etc. without consideration of a current network environment.

In a mixed macrocell/femtocell deployment, frequent idle-mode system reselections between macrocells and collocated femtocells can happen by a fast moving mobile device (e.g., a vehicular mobile device) entering and leaving patchy femtocell coverage and/or mobile device ping-ponging between a macrocell and collocated femtocells due to channel fading. Frequent system reselections are not desirable because they can lead to frequent mobile device registrations on different systems, which in turn may cause device battery drainage, increase in signaling load, missing of pages, and other problems that adversely affect transmission and processing of data and hence user experience. Therefore, it is desirable to regulate system reselection process for idle-mode mobile devices with the objective to reduce a ping-pong effect during wireless system reselection.

SUMMARY

The following presents a simplified summary of one or more aspects of mechanisms for regulating frequent cell reselections by idle-mode mobile devices. This summary is not an extensive overview of all contemplated aspects of the invention, and is intended to neither identify key or critical elements of the invention nor delineate the scope of any or all aspects thereof. Its sole purpose is to present some concepts of one or more aspects in a simplified form as a prelude to the more detailed description that is presented later.

In general, the systems and methods disclosed herein facilitate regulation of frequent system reselections by idle-mode mobile devices by slowing down inter-frequency reselection from macrocells to femtocells and allow reselection to femtocells only when femtocells channel quality is good. For example, according to one aspect, a femtocell may be configured to reduce frequency of its reselection beacon, which reduces probability that a fast moving mobile device will detect the reselection beacon and reselect to that femtocell. This aspect may also delay femtocell reselection for slow moving mobile devices. In another aspect, a macrocell may slow down system reselection by adjusting cell reselection parameters used by mobile devices to determine the time needed to evaluate cell reselection criteria. Yet in another aspect, a macrocell may instruct a collocated femtocell to decrease its effective coverage area to avoid premature reselection by fast moving mobile devices. Yet in another aspect, a femtocell may use power boosting techniques to increase its reselection radius. Other aspects will be presented in a detailed description that follows.

In an aspect, a method of regulating wireless system reselection in a femtocell includes detecting, by the femtocell, frequent system reselections by a mobile device. Additionally, the method may include reducing frequency of transmitting a reselection beacon by the femtocell.

In other aspects, an apparatus may include one or more means for performing the actions of the above-noted method. Further, in still other aspects, a computer program product may include a computer-readable medium having one or more codes for performing the actions of the above-noted method.

In a further aspect, an apparatus for regulating wireless system reselection in a femtocell includes mobile device reselection regulating component configured to detect frequent system reselections by a mobile device. Additionally, the apparatus includes a reselection beacon regulating component configured to reduce frequency of transmitting a reselection beacon by the femtocell.

In another aspect, a method for regulating wireless system reselection in a femtocell includes receiving, by the femtocell, a registration request from a mobile device, and determining whether one or more other registration requests were previously received from the mobile device. Further, when one or more other registration requests were previously received from the mobile device, the method includes registering the mobile device with the femtocell. Additionally, when no other registration requests were previously received from the mobile device, the method includes rejecting the registration request from the mobile device.

In other aspects, an apparatus may include one or more means for performing the actions of the above-noted method. Further, in still other aspects, a computer program product may include a computer-readable medium having one or more codes for performing the actions of the above-noted method.

In a further aspect, an apparatus for regulating wireless system reselection in a femtocell includes a receiver configured to receive a registration request from a mobile device, and a mobile device reselection regulating component configured to determine whether one or more other registration requests were previously received from the mobile device. Further, when one or more other registration requests were previously received from the mobile device, the mobile device reselection regulating component is configured to register the mobile device with the femtocell. Additionally, when no other registration requests were previously received from the mobile device, the mobile device reselection regulating component is configured to reject the registration request from the mobile device.

To the accomplishment of the foregoing and related ends, the one or more aspects comprise the features hereinafter fully described and particularly pointed out in the claims. The following description and the annexed drawings set forth in detail certain illustrative features of the one or more aspects. These features are indicative, however, of but a few of the various ways in which the principles of various aspects may be employed, and this description is intended to include all such aspects and their equivalents.

BRIEF DESCRIPTION OF THE DRAWINGS

The disclosed aspects will hereinafter be described in conjunction with the appended drawings, provided to illustrate and not to limit the disclosed aspects, wherein like designations denote like elements, and in which.

DETAILED DESCRIPTION

Figure 1:
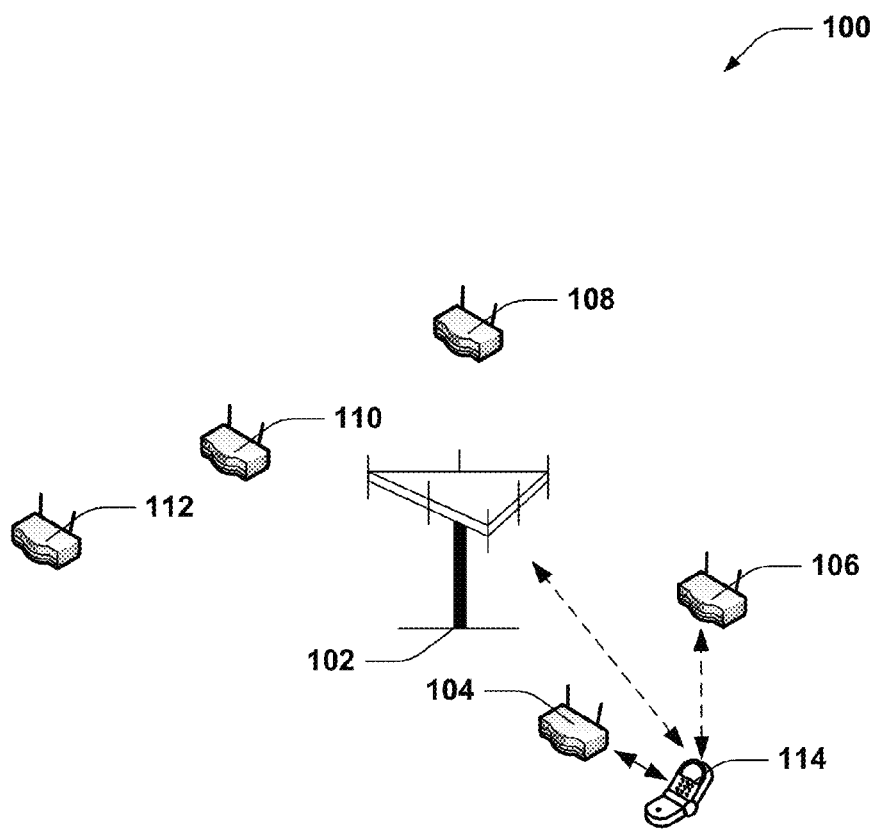
FIG. 1 is a block diagram of an example system that facilitates regulation of frequent reselections by idle-mode mobile device.

Various aspects are now described with reference to the drawings. In the following description, for purposes of explanation, numerous specific details are set forth in order to provide a thorough understanding of one or more aspects. It may be evident, however, that such aspect(s) may be practiced without these specific details.

In various aspects, disclosed herein mechanisms for regulating frequent cell reselections by idle-mode mobile devices. As generally known in the art, a mobile device can also be called a system, device, subscriber unit, subscriber station, mobile station, mobile, remote station, mobile terminal, remote terminal, access terminal, user terminal, terminal, communication device, user agent, user device, or user equipment (UE). A mobile device may be a cellular telephone, a satellite phone, a cordless telephone, a Session Initiation Protocol (SIP) phone, a wireless local loop (WLL) station, a personal digital assistant (PDA), a handheld device having wireless connection capability, a tablet, a computing device, or other processing devices connected via a wireless modem to one or more base stations (BS) that provide cellular or wireless network access to the mobile device.

A base station (BS) may be utilized for communicating with mobile devices(s) and may also be referred to as an access point, femto node, a pico node, micro node, a Node B, evolved Node B (eNB), home Node B (HNB) or home evolved Node B (HeNB), collectively referred to as H(e)NB, or some other terminology. These base stations are generally considered to be low-power base stations. For example, a low-power base station transmits at a relatively low power as compared to a macro base station associated with a wireless wide area network (WWAN). As such, the coverage area of the low power base station can be substantially smaller than the coverage area of a macro base station.

The techniques described herein may be used for various wireless communication systems such as CDMA, TDMA, FDMA, OFDMA, SC-FDMA, WiFi carrier sense multiple access (CSMA), and other systems. The terms "system" and "network" are often used interchangeably. A CDMA system may implement a radio technology such as Universal Terrestrial Radio Access (UTRA), cdma2000, etc. UTRA includes Wideband-CDMA (W-CDMA) and other variants of CDMA. Further, cdma2000 covers IS-2000, IS-95 and IS-856 standards. A TDMA system may implement a radio technology such as Global System for Mobile Communications (GSM). An OFDMA system may implement a radio technology such as Evolved UTRA (E-UTRA), Ultra Mobile Broadband (UMB), IEEE 802.11 (Wi-Fi), IEEE 802.16 (WiMAX), IEEE 802.20, Flash-OFDM®, etc. UTRA and E-UTRA are part of Universal Mobile Telecommunication System (UMTS). 3GPP Long Term Evolution (LTE) is a release of UMTS that uses E-UTRA, which employs OFDMA on the downlink and SC-FDMA on the uplink. UTRA, E-UTRA, UMTS, LTE and GSM are described in documents from an organization named "3rd Generation Partnership Project" (3GPP). Additionally, cdma2000 and UMB are described in documents from an organization named "3rd Generation Partnership Project 2" (3GPP2). Further, such wireless communication systems may additionally include peer-to-peer (e.g., mobile-to-mobile) ad hoc network systems often using unpaired unlicensed spectrums, 802.xx wireless LAN, BLUETOOTH and any other short- or long-range, wireless communication techniques.

Various aspects or features will be presented in terms of systems that may include a number of devices, components, modules, and the like. It is to be understood and appreciated that the various systems may include additional devices, components, modules, etc. and/or may not include all of the devices, components, modules etc. discussed in connection with the figures. A combination of these approaches may also be used.

FIG. 1 shows an example wireless communication system 100. System 100 includes a macro base station 102, which forms a macrocell (not shown in FIG. 1, but described in greater detail below with reference in FIG. 9), that can provide one or more devices with access to a wireless network. The wireless communication system 100 also includes femto nodes 104, 106, 108, 110, and 112, which can also provide wireless network access over a backhaul link (not shown) with a mobile network over a broadband internet connection. In one example, femto nodes 104, 106, 108, 110, and/or 112 can be other types of low power base stations, a relay node, a device (e.g., communicating in peer-to-peer or ad-hoc mode with other devices), etc. Each femto node forms a femtocell (not shown in FIG. 1, but described in greater detail below with reference in FIG. 9). Moreover, the system 100 includes a mobile device 114 that communicates with macro base station 102 and one or more femto nodes 104 or 106 to receive wireless access to the wireless network.

In the depicted mixed macrocell/femtocell deployment, frequent idle-mode system reselections between macro base station 102 and the collocated femto nodes 104, 106, 108, 110, and 112 can happen by a fast-moving mobile device 114 (e.g., a vehicular mobile device) entering and leaving patchy femtocell coverage and/or mobile device 114 ping-ponging between the macrocell 102 and the femtocells 104, 106, 108, 110, and 112. Frequent system reselections may be considered multiple attempts by a mobile device or attempt by a number of mobile devices to register and/or deregister with adjacent femtocells or macrocells within a short period of time (e.g. 10 minutes). Frequent system reselections are not desirable because they may cause frequent mobile device registrations on different systems (e.g., femtocell and macrocells), which in turn may cause device battery drainage, signaling load, missing of pages, and other problems. Therefore, it is desirable to regulate system reselection for the idle-mode mobile devices and to reduce reselection-caused ping-pong effect between macrocell and collocated femtocells.

Figure 2:
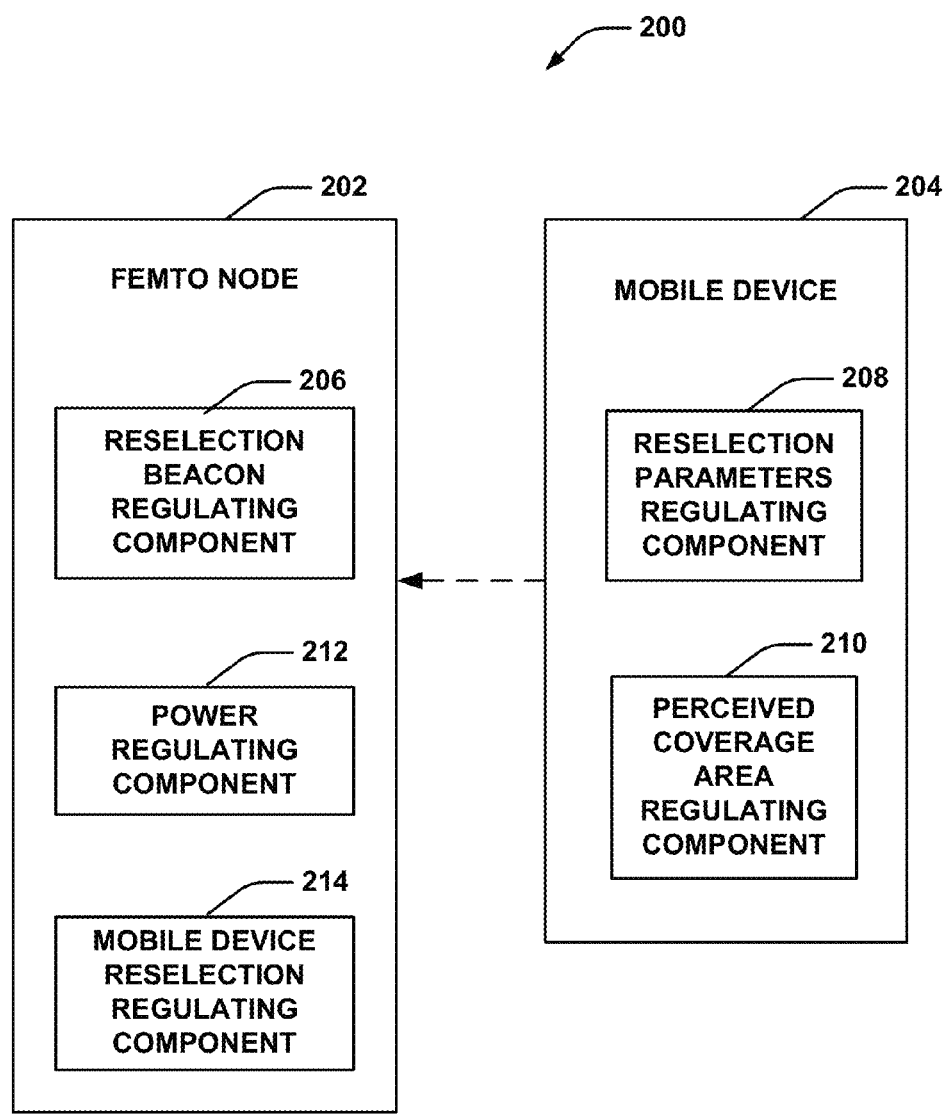
FIG. 2 is a block diagram of an example system that facilitates regulation of frequent reselections by idle-mode mobile device according to one aspect.

FIG. 2 illustrates an example system 200 for regulating frequent system reselection by idle-mode mobile devices. System 200 includes a femto node 202, which can be substantially any low power base station, and can, in one example, include one or more of femto nodes 104, 106, 108, 110, and/or 112 (FIG. 1), as described herein, as well as a mobile device 204. In general, femto node 202 may includes a plurality of components that regulate macrocell/femtocell reselection by the idle-mode mobile device 114, including, but are not limited to, a reselection beacon regulating component 206 and a power regulating component 212. Mobile device 204 may include a plurality of components that regulate macrocell/femtocell reselection by the idle-mode mobile device, including, but not limited to, a reselection parameters regulating component 208 and a coverage area regulating component 210. Each of these components will be described in greater detail herein below.

In one aspect, the reselection beacon regulating component 206 of the femto node 202 may regulate a reselection beacon transmitted by the femto node 202. Reselection beacons are periodically transmitted by femtocells on the same RF channel(s) as those used by a collocated macro base station in order to temporary jam (e.g., create interference with) RF signals transmitted by the macro base station, thereby forcing any mobile devices 204 located in the coverage area of the femtocell 202 and the collocated macrocell to reselect from the serving macrocell to the target femtocell 202. Particularly, in one aspect, the reselection beacon regulating component 206 can reduce frequency with which femto node 202 transmits its reselection beacon. This may lower the probability that a fast-moving mobile device 204 will detect the reselection beacon transmitted by the femto node 202 and reselect to that femtocell 202. It may also delay femtocell reselection for slow-moving mobile devices 204.

However, regulating the reselection beacon may not necessarily slow down system reselections by a mobile device 204 when it performs inter-frequency searches for other reasons, e.g., poor RF channel conditions of the serving macrocell 204, when the mobile device is programmed to search in every DRX cycle, or when $S_{intersearch}$ threshold is set to a very high value. In these cases, other regulation methods disclosed herein may be used.

In another aspect, the reselection parameters regulating component 208 of the mobile device 204 may slow down system reselection by adjusting cell reselection parameters used by the mobile device 204 to determine the time it needs to evaluate cell reselection criteria. For example, macrocell may regulate a reselection parameter used by idle-mode mobile device 204 to determine the time they need to evaluate cell reselection criteria. The Treselection and other reselection parameters are usually broadcasted by macro base station using SIB messages (for example, SIB3). The mobile device 204 uses Treselection parameter for intra-frequency, inter-frequency and inter-RAT reselections. In particular, the mobile device continuously evaluates target cell quality in every DRX cycle for the Treselection time. Therefore, the Treselection parameter may be used to avoid pre-mature reselection to the target cell.

To that end, in one aspect, the Treselection parameter may be increased by the reselection parameter regulating component 208, based on macro base station broadcast, in order to delay fast moving mobile device 204 from camping on femtocells. Since femtocells generally operate on a different RF channel than macrocells, only inter-frequency reselections need to be delayed. In one example, this can be achieved by adjusting the "Inter-frequency ScalingFactor for Treselection" information element (IE) in addition to Treselection parameter. Reselection Evaluation='Treselections'×Scaling Factor, where the range of Scaling Factor may be equal to, e.g., 1 to 4.75. In another example, this can be achieved by adjusting a Treselection (or T-Reselection) parameter specific for inter-frequency reselection. In other aspects, different reselection parameters may be regulated by the femtocells in order to prevent frequent reselection by idle-mode mobile devices.

Figure 3A:
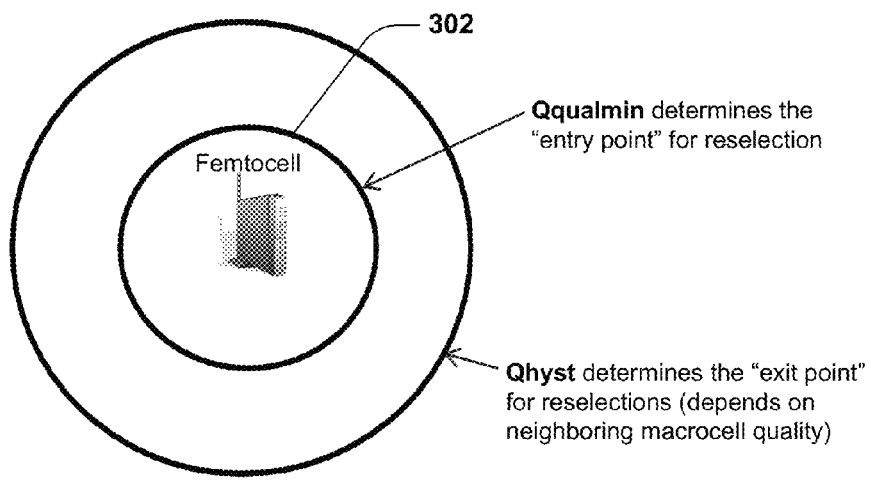
FIGS. 3A and 3B are diagrams of an example system in which regulation of frequent reselections by idle-mode mobile device is performed.

In another aspect, perceived coverage area regulating component 210 of the mobile device 204 maybe also used to avoid premature reselection by fast-moving mobile devices 114. Particularly, increased Qqualmin parameter may be provided to component 210 in order to shrink the perceived effective coverage area of the femtocell. Qqualmin parameter is usually provided per neighboring cell (or PSC) in SIB messages (for example, SIB11) by the collocated macro base station. Qqualmin parameter is can also be provided by the femtocell in its SIB messages (for example, SIB3). Qqualmin indicates the signal-to-interference ratio (Ec/I0) or received signal power below which mobile device considers the neighboring cell as unsuitable for reselection. As shown in FIG. 3A, Qqualmin determines the "entry point" for reselections, thereby effectively controlling the radius of the femtocell coverage. Qhyst parameter determines the "exit point" for reselections. Therefore, in order to prevent frequent system reselections, perceived diameter of Qqualmin coverage should be less than the distance covered by minimum fast moving mobile device in a Treselection time or Scaling Factor times Treselection. For example, (Diameter of Qqualmin coverage)<(min fast moving UE speed)×Scaling Factor×Treselection. For example, for mobile device speed=10 m/s (~22.5 mph), scaling factor=4.75, Treselection=1 sec; therefore, (Diameter of Qqualmin coverage)<47.5 m.

Figure 3B:
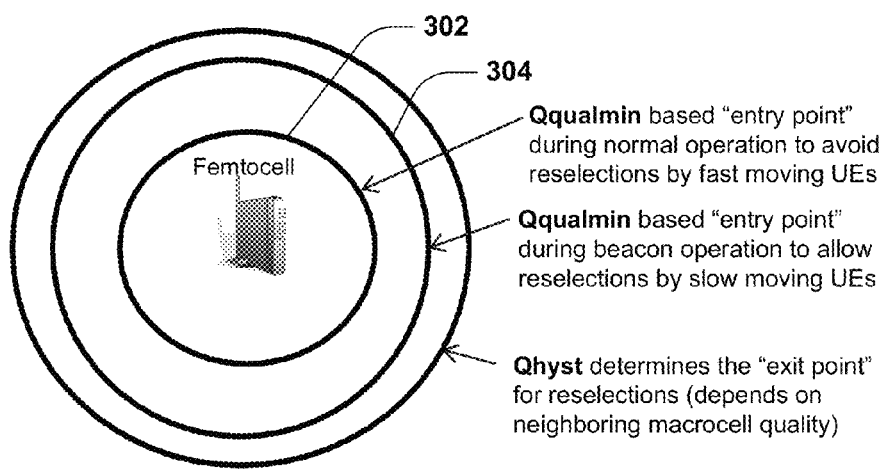

In another aspect, power regulating component 212 of the femto node 202 may provide power boosting to increase a cell reselection radius. A fixed high value of Qqualmin may impact discovery of slow moving mobile devices 114 because mobile devices that are reasonably closer to the femtocell 202 may not be able to reselect to it. In such a case, power regulating component 212 of the femto node 202 may periodically boost its pilot power momentarily to increase its reselection radius of the femtocell. Such power boost can be coordinated with the transmission of the reselection beacon by the femtocell as described above. This is illustrated in FIG. 3B in which radius 302 corresponds to Qqualmin based "entry point" during normal operation (also shown in FIG. 3A) that prevents reselection by fast moving mobile devices, and radius 304 corresponds to Qqualmin based "entry point" during power-boosted beacon operation, which facilitates system reselection for slow moving mobile devices.

In alternative aspect, the femto node 202 may include a mobile device reselection regulating component 214 configured to prevent frequent reselections by rejecting at least the first registration attempt by idle-mode mobile device 204. For example, when the mobile device send "RRC Connection Request" message, which identifies the mobile device using IMSI, TMSI or P-TMSI identifier, to request a connection with the femtocell 202, the femto node 202 and/or mobile device reselection regulating component 214 may check for any recent registration attempts by the mobile device with the same ID and if no prior attempts took place respond to the mobile device with a "RRC Connection Reject" message. However, when a second or subsequent registration message is received from the same mobile device, the femto node 202 and/or mobile device reselection regulating component 214 may not accept the registration from the mobile device. It is also possible that mobile device reselection regulating component 214, while rejecting the mobile device, may redirect the mobile device to a different frequency/RAT layer and forbid it from re-registering to the same femtocell or its frequency/RAT for some time (e.g., few seconds). In this case, the femto node 202 and/or mobile device reselection regulating component 214 may send the "RRC Connection Reject" message with "Redirection info" and "Wait Time".

Figure 4A:
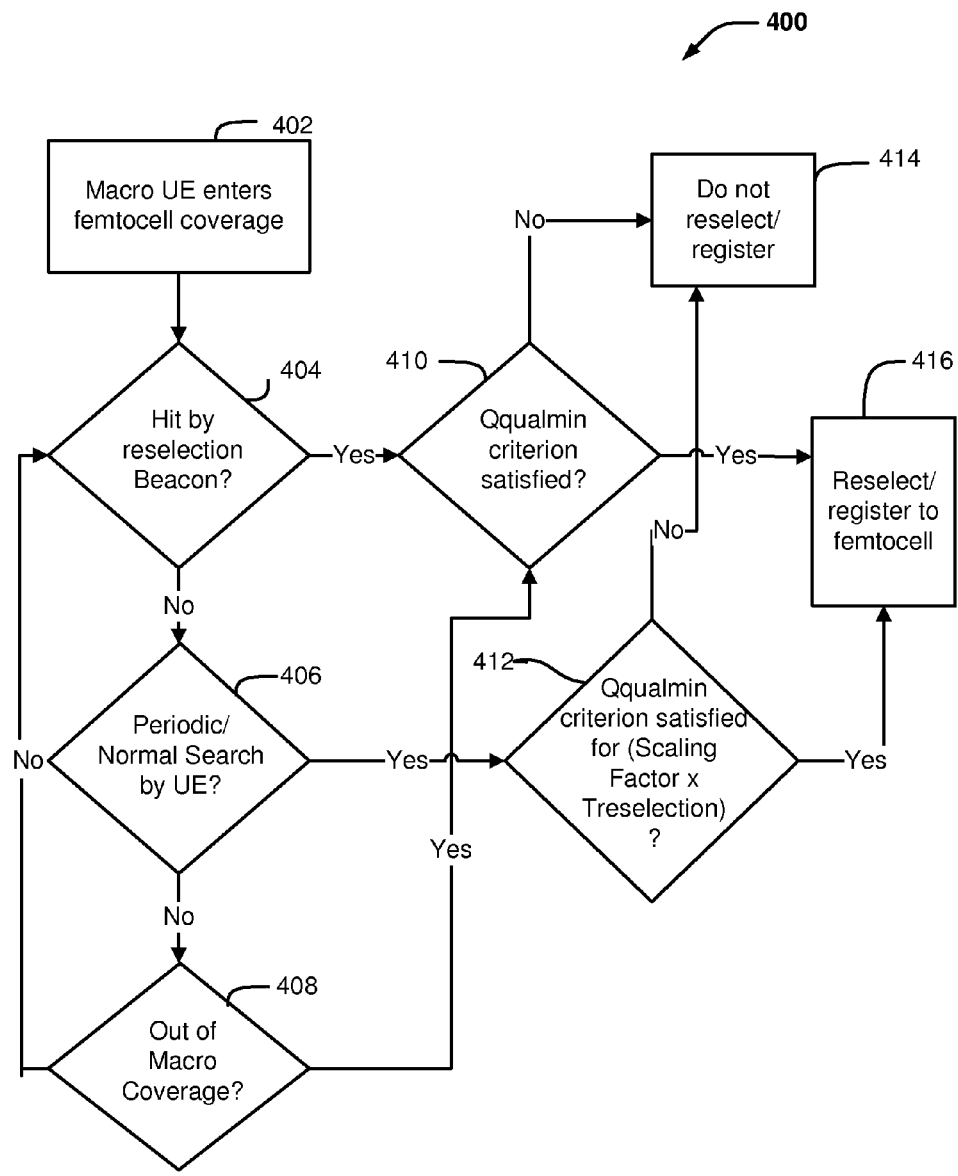
FIGS. 4A and 4B are flow charts of different aspects of example methodologies for regulating frequent reselections by idle-mode mobile device.

FIG. 4A shows an example method for regulation of frequent reselections by an idle-mode mobile device, such as a mobile device 114 of FIG. 1 or mobile device 204 of FIG. 2. While, for purposes of simplicity of explanation, the methodology is shown and described as a series of acts, it is to be understood and appreciated that the methodology is not limited by the order of acts, as some acts may, in accordance with one or more embodiments, occur in different orders and/or concurrently with other acts from that shown and described herein. For example, it is to be appreciated that a methodology could alternatively be represented as a series of interrelated states or events, such as in a state diagram. Moreover, not all illustrated acts may be required to implement a methodology in accordance with one or more embodiments.

In FIG. 4A, a mobile device enters coverage areas of a femtocell. If at step 404, the mobile device is hit by a reselection beacon from the femtocell, then at step 410, the mobile device checks if the Qqualmin criterion, set for the femtocell, is satisfied. In other words, the mobile device determines if the signal strength from the femtocell falls within the coverage area allowed for the cell. If Qqualmin criterion is satisfied at step 410, then the mobile device reselects/registers with the femtocell at step 416. If Qqualmin criterion is not satisfied at step 410, then the mobile device does not reselects/registers with the femtocell at step 414. If however, at step 404, no reselection beacon was transmitted by the femtocell, the mobile device may detect presence of the femtocell, at step 406, using periodic/normal system reselection searches. If a nearby femtocell is detected by the mobile device at step 406, then the mobile device checks if the Qqualmin criterion (adjusted by the Scaling Factor and Treselection parameters) is satisfied. As indicated above, these parameters are selected to prevent system reselection by fast moving mobile devices. If adjusted Qqualmin criterion is satisfied at step 412, then the mobile device reselects/registers with the femtocell at step 416. If Qqualmin criterion is not satisfied at step 412, then the mobile device does not reselects/registers with the femtocell at step 414. If the mobile device does not detect femtocell at step 406 during normal reselection procedure, then mobile device may determine at step 408 if the mobile device is out of coverage of any macrocell. If the device is within coverage of a macrocell it may continue listening for any beacons from femtocells at step 404. If however, the mobile device is out of the coverage of macrocell, then only Qualmin criteria on femtocell may be verified at steps 410. It should be noted that in one aspect, steps 410 and 412 may include testing if both S and R criteria are satisfied: S criteria includes both Qqualmin and Qrxlevmin; R criteria is a ranking criteria, to ensure that the femto has better quality than the current serving cell.

Figure 4B:
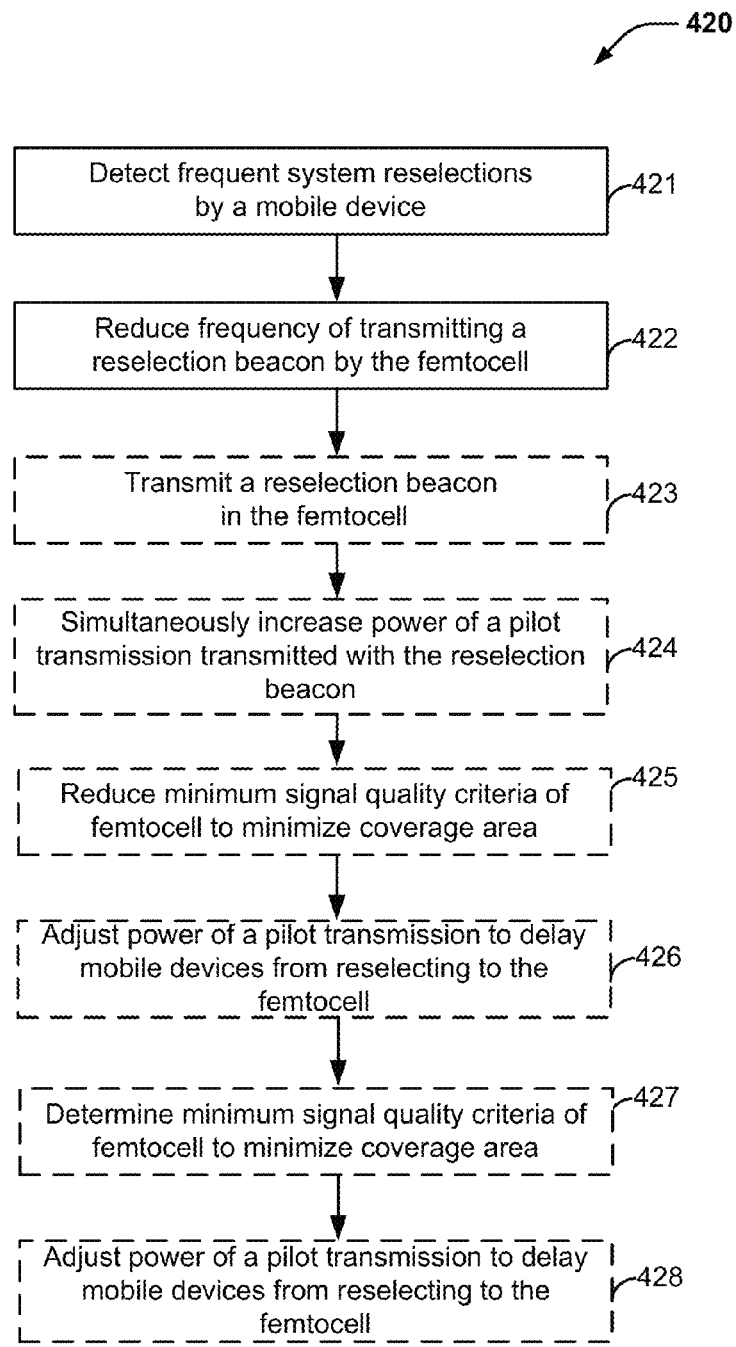

FIG. 4B shows an example method for regulating wireless system reselection in a femtocell, such as a femtocell 102 of FIG. 1 or femto node 202 of FIG. 2. While, for purposes of simplicity of explanation, the methodology is shown and described as a series of acts, it is to be understood and appreciated that the methodology is not limited by the order of acts, as some acts may, in accordance with one or more embodiments, occur in different orders and/or concurrently with other acts from that shown and described herein. For example, it is to be appreciated that a methodology could alternatively be represented as a series of interrelated states or events, such as in a state diagram. Moreover, not all illustrated acts may be required to implement a methodology in accordance with one or more embodiments.

In FIG. 4B, at step 421, method 420 includes detecting, by the femtocell, frequent system reselections by a mobile device. For example, in an aspect, in response to a registration request from a mobile device, femto node 202 may include mobile device regulating component 214 configured to determine whether or not the same mobile device has made prior requests and deny the current request and/or, for example, instruct the mobile device to delay future requests. Further, at step 422, method 421 includes reducing frequency of transmitting a reselection beacon by the femtocell. For example, in an aspect, femto node 202 may include reselection beacon regulating component 206 configured to reduce a reducing frequency of transmitting a reselection beacon. Optionally, at steps 423 and 424, method 420 may include transmitting a reselection beacon in the femtocell, and simultaneously increasing a power of a pilot transmission that is transmitted at a same time as the reselection beacon transmission. For example, in an aspect, femto node 202 may include reselection beacon regulating component 206 configured to cause transmission of the reselection beacon, and power regulating component 212 configured to increase a power of a pilot transmission at a same time as the reselection beacon transmission. In a further option, at step 425, which may be conditioned on steps 423 and 424, method 420 may include reducing a minimum signal quality criteria of the femtocell to minimize a coverage area of the femtocell. For example, in an aspect, power regulating component 212 may be configured to reduce a minimum signal quality criteria of the femtocell to minimize a coverage area of the femtocell. In another optional aspect, at step 426, method 420 may include adjusting power of a pilot transmission to delay mobile devices from reselecting to the femtocell. For example, in an aspect, power regulating component 212 may be configured to adjust a power of a pilot transmission to delay mobile devices from reselecting to the femtocell. Further, in an optional aspect, method 420 at steps 427 and 428 may include determining a minimum signal quality criteria of the femtocell as broadcasted by one or more collocated macrocells, and adjusting power of a pilot transmission at least in part based on the determined minimum signal quality criteria of the femtocell. For example, in an aspect, power regulating component 212 may be configured to determine a minimum signal quality criteria of the femtocell as broadcasted by one or more collocated macrocells, and adjust a power of a pilot transmission at least in part based on the determined minimum signal quality criteria of the femtocell.

Figure 5A:
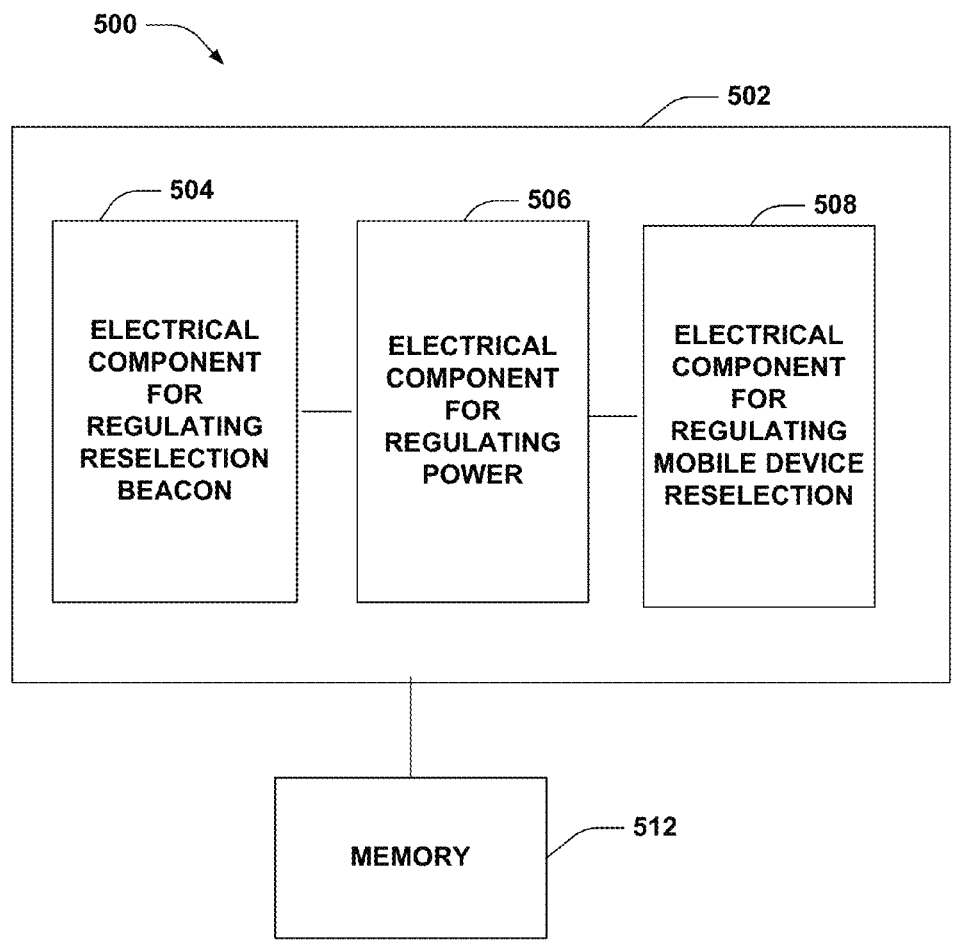
FIGS. 5A and 5B are block diagrams of example systems that regulate frequent reselections by idle-mode mobile device.
Figure 5B:
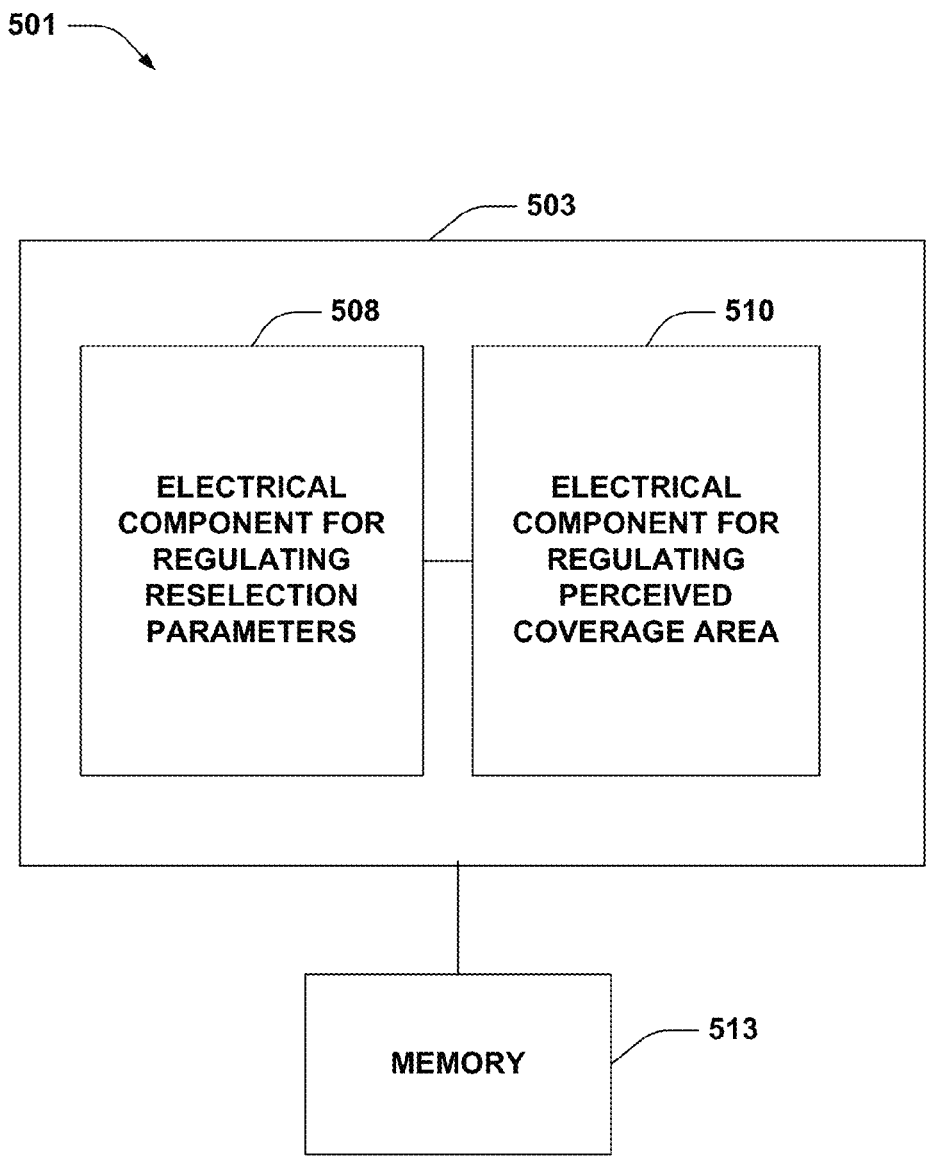

FIGS. 5A and 5B illustrate systems 500 and 501 for regulating frequent reselections by idle-mode mobile devices. System 500 may be implemented in femto node, such as node 104 of FIG. 1. System 501 may be implemented in a mobile device, such as mobile device 114 of FIG. 1. It is to be appreciated that systems 500 and 501 are represented as including functional blocks, which can be functional blocks that represent functions implemented by a processor, software, or combination thereof (e.g., firmware). In FIG. 5A, system 500 includes a logical grouping 502 of electrical components that can act in conjunction. For instance, logical grouping 502 can include an electrical component 504 for regulating a reselection beacon of the femtocell, an electrical component 506 regulating transmission power of the femtocell, and an electrical component 508 for regulating mobile device reselection. In FIG. 5B, system 501 includes a logical grouping 503 of electrical components that can act in conjunction. For instance, logical grouping 503 can include an electrical component 508 for regulating reselection parameters of the mobile device and an electrical component 510 for regulating perceived coverage area of the femtocell.

Additionally, system 500 can include a memory 512 that retains instructions for executing functions associated with the electrical components 504, 506, and 508. While shown as being external to memory 512, it is to be understood that one or more of the electrical components 504, 506, and 508 can exist within memory 512. In one example, electrical components 504, 506, and 508 can comprise at least one processor, or each electrical component 504, 506, and 508 can be a corresponding module of at least one processor. Moreover, in an additional or alternative example, electrical components 504, 506, and 508 can be a computer program product comprising a computer readable medium, where each electrical component 504, 506, and 508 can be corresponding code.

Likewise, system 501 can include a memory 513 that retains instructions for executing functions associated with the electrical components 508 and 510. While shown as being external to memory 513, it is to be understood that one or more of the electrical components 508 and 510 can exist within memory 513. In one example, electrical components 508 and 510 can comprise at least one processor, or each electrical component 508 and 510 can be a corresponding module of at least one processor. Moreover, in an additional or alternative example, electrical components 508 and 510 can be a computer program product comprising a computer readable medium, where each electrical component 508 and 510 can be corresponding code.

Figure 6:
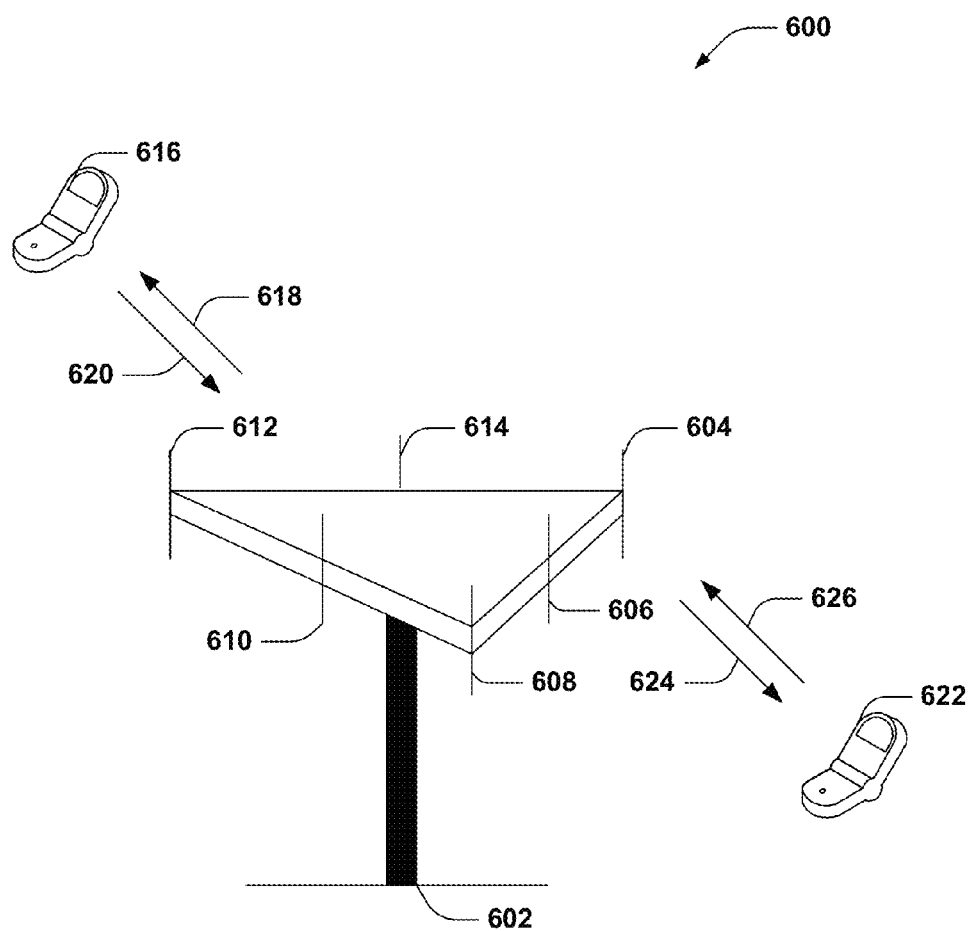
FIG. 6 is a block diagram of an example wireless communication system in accordance with various aspects set forth herein.

Referring now to FIG. 6, a wireless communication system 600 in which mechanisms for regulation of fast handover may be implemented. System 600 comprises a base station 602, which may be a femto node, such as nodes 102 or 202 or system 500, and may include the components and implement the functions described above with respect to FIGS. 1-5. In one aspect, base station 602 can include multiple antenna groups. For example, one antenna group can include antennas 604 and 606, another group can comprise antennas 608 and 610, and an additional group can include antennas 612 and 614. Two antennas are illustrated for each antenna group; however, more or fewer antennas can be utilized for each group. Base station 602 can additionally include a transmitter chain and a receiver chain, each of which can in turn comprise a plurality of components associated with signal transmission and reception (e.g., processors, modulators, multiplexers, demodulators, demultiplexers, antennas, etc.), as is appreciated.

Base station 602 can communicate with one or more mobile devices such as mobile device 616 and mobile device 622; however, it is to be appreciated that base station 602 can communicate with substantially any number of mobile devices similar to mobile devices 616 and 622. Mobile devices 616 and 622 can be, for example, cellular phones, smart phones, laptops, handheld communication devices, handheld computing devices, satellite radios, global positioning systems, PDAs, and/or any other suitable device for communicating over wireless communication system 600. As depicted, mobile device 616 is in communication with antennas 612 and 614, where antennas 612 and 614 transmit information to mobile device 616 over a forward link 618 and receive information from mobile device 616 over a reverse link 620. Moreover, mobile device 622 is in communication with antennas 604 and 606, where antennas 604 and 606 transmit information to mobile device 622 over a forward link 624 and receive information from mobile device 622 over a reverse link 626. In a frequency division duplex (FDD) system, forward link 618 can utilize a different frequency band than that used by reverse link 620, and forward link 624 can employ a different frequency band than that employed by reverse link 626, for example. Further, in a time division duplex (TDD) system, forward link 618 and reverse link 620 can utilize a common frequency band and forward link 624 and reverse link 626 can utilize a common frequency band.

Each group of antennas and/or the area in which they are designated to communicate can be referred to as a sector of base station 602. For example, antenna groups can be designed to communicate to mobile devices in a sector of the areas covered by base station 602. In communication over forward links 618 and 624, the transmitting antennas of base station 602 can utilize beamforming to improve signal-to-noise ratio of forward links 618 and 624 for mobile devices 616 and 622. Also, while base station 602 utilizes beamforming to transmit to mobile devices 616 and 622 scattered randomly through an associated coverage, mobile devices in neighboring cells can be subject to less interference as compared to a base station transmitting through a single antenna to all its mobile devices. Moreover, mobile devices 616 and 622 can communicate directly with one another using a peer-to-peer or ad hoc technology as depicted. According to an example, system 600 can be a multiple-input multiple-output (MIMO) communication system.

Figure 7:
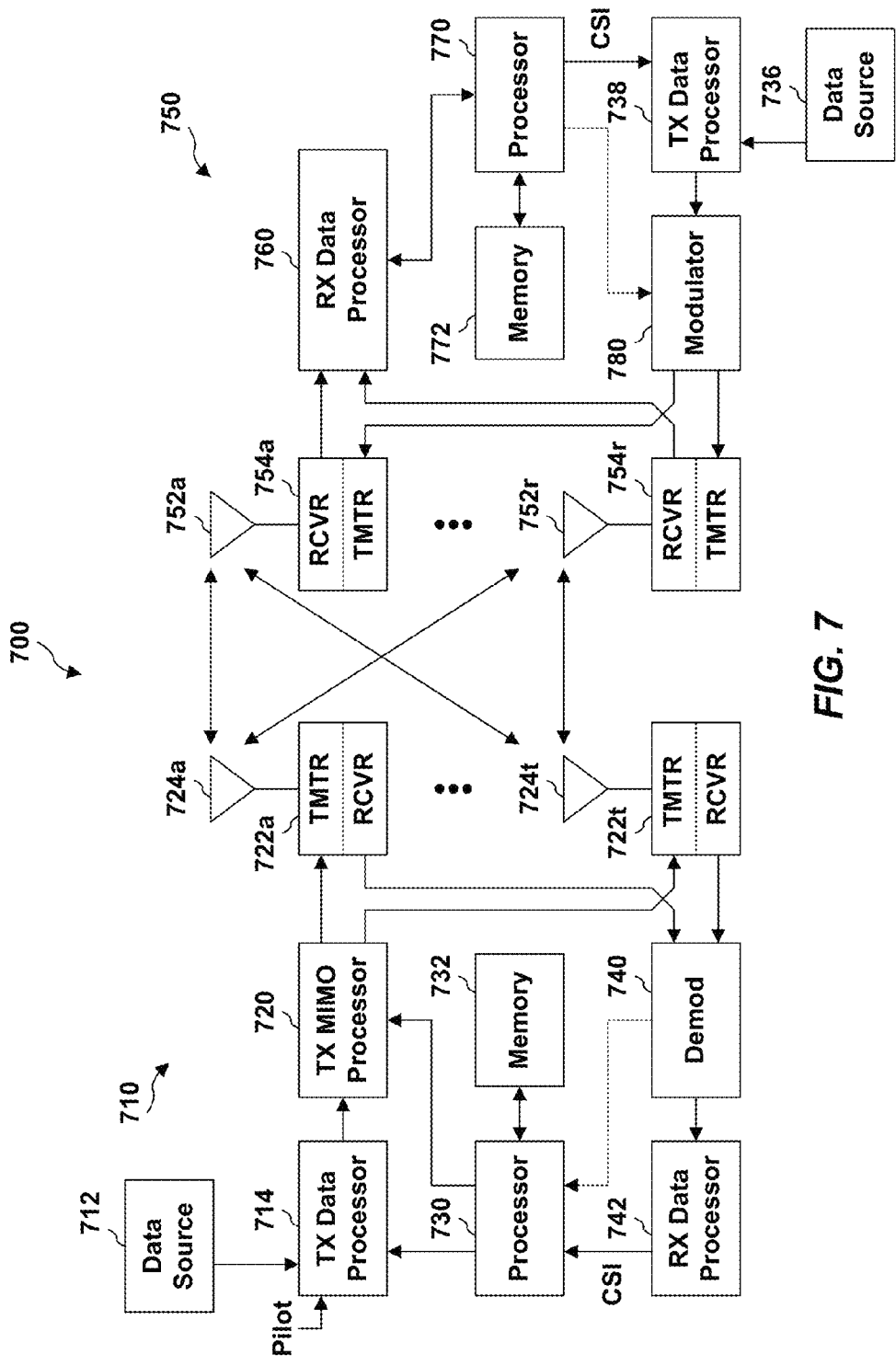
FIG. 7 is an illustration of an example wireless network environment that can be employed in conjunction with the various systems and methods described herein.

FIG. 7 shows an example wireless communication system 700. The wireless communication system 700 depicts one base station 710, which can include a femto node, and one mobile device 750 for sake of brevity. However, it is to be appreciated that system 700 can include more than one base station and/or more than one mobile device, wherein additional base stations and/or mobile devices can be substantially similar or different from example base station 710 and mobile device 750 described below. In addition, it is to be appreciated that base station 710 and/or mobile device 750 can employ the systems (FIGS. 1, 2, 3, 5, and 6) and/or methods (FIG. 4) described herein to facilitate wireless communication there between. For example, components or functions of the systems and/or methods described herein can be part of a memory 732 and/or 772 or processors 730 and/or 770 described below, and/or can be executed by processors 730 and/or 770 to perform the disclosed functions.

At base station 710, traffic data for a number of data streams is provided from a data source 712 to a transmit (TX) data processor 714. According to an example, each data stream can be transmitted over a respective antenna. TX data processor 714 formats, codes, and interleaves the traffic data stream based on a particular coding scheme selected for that data stream to provide coded data.

The coded data for each data stream can be multiplexed with pilot data using orthogonal frequency division multiplexing (OFDM) techniques. Additionally or alternatively, the pilot symbols can be frequency division multiplexed (FDM), time division multiplexed (TDM), or code division multiplexed (CDM). The pilot data is typically a known data pattern that is processed in a known manner and can be used at mobile device 750 to estimate channel response. The multiplexed pilot and coded data for each data stream can be modulated (e.g., symbol mapped) based on a particular modulation scheme (e.g., binary phase-shift keying (BPSK), quadrature phase-shift keying (QPSK), M-phase-shift keying (M-PSK), M-quadrature amplitude modulation (M-QAM), etc.) selected for that data stream to provide modulation symbols. The data rate, coding, and modulation for each data stream can be determined by instructions performed or provided by processor 730.

The modulation symbols for the data streams can be provided to a TX MIMO processor 720, which can further process the modulation symbols (e.g., for OFDM). TX MIMO processor 720 then provides $N_T$ modulation symbol streams to $N_T$ transmitters (TMTR) 722a through 722t. In various embodiments, TX MIMO processor 720 applies beamforming weights to the symbols of the data streams and to the antenna from which the symbol is being transmitted.

Each transmitter 722 receives and processes a respective symbol stream to provide one or more analog signals, and further conditions (e.g., amplifies, filters, and upconverts) the analog signals to provide a modulated signal suitable for transmission over the MIMO channel. Further, $N_T$ modulated signals from transmitters 722a through 722t are transmitted from $N_T$ antennas 724a through 724t, respectively.

At mobile device 750, the transmitted modulated signals are received by $N_R$ antennas 752a through 752r and the received signal from each antenna 752 is provided to a respective receiver (RCVR) 754a through 754r. Each receiver 754 conditions (e.g., filters, amplifies, and downconverts) a respective signal, digitizes the conditioned signal to provide samples, and further processes the samples to provide a corresponding "received" symbol stream.

An RX data processor 760 can receive and process the $N_R$ received symbol streams from $N_R$ receivers 754 based on a particular receiver processing technique to provide $N_T$ "detected" symbol streams. RX data processor 760 can demodulate, deinterleave, and decode each detected symbol stream to recover the traffic data for the data stream. The processing by RX data processor 760 is complementary to that performed by TX MIMO processor 720 and TX data processor 714 at base station 710.

The reverse link message can comprise various types of information regarding the communication link and/or the received data stream. The reverse link message can be processed by a TX data processor 738, which also receives traffic data for a number of data streams from a data source 736, modulated by a modulator 780, conditioned by transmitters 754a through 754r, and transmitted back to base station 710.

At base station 710, the modulated signals from mobile device 750 are received by antennas 724, conditioned by receivers 722, demodulated by a demodulator 740, and processed by a RX data processor 742 to extract the reverse link message transmitted by mobile device 750. Further, processor 730 can process the extracted message to determine which precoding matrix to use for determining the beamforming weights.

Processors 730 and 770 can direct (e.g., control, coordinate, manage, etc.) operation at base station 710 and mobile device 750, respectively. Respective processors 730 and 770 can be associated with memory 732 and 772 that store program codes and data. Processors 730 and 770 can also perform functionalities described herein to support selecting a paging area identifier for one or more femto nodes.

Figure 8:
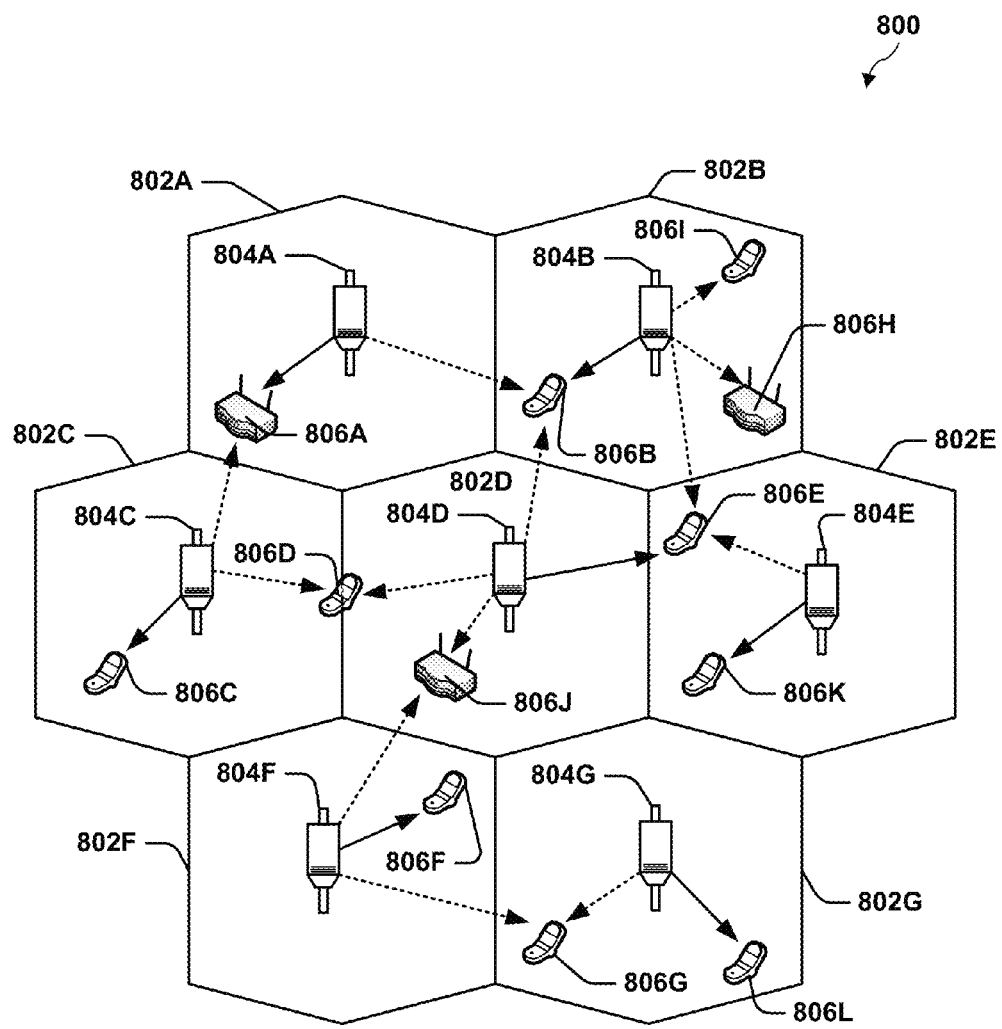
FIG. 8 illustrates an example wireless communication system, configured to support a number of devices, in which the aspects herein can be implemented.

FIG. 8 illustrates a wireless communication system 800, configured to support a number of users, in which the teachings herein may be implemented. The system 800 provides communication for multiple cells 802, such as, for example, macro cells 802A-802G, with each cell being serviced by a corresponding access node 804 (e.g., access nodes 804A-804G). As shown in FIG. 8, mobile devices 806 (e.g., mobile devices 806A-806L) can be dispersed at various locations throughout the system over time. Each mobile device 806 can communicate with one or more access nodes 804 on a forward link (FL) and/or a reverse link (RL) at a given moment, depending upon whether the mobile device 806 is active and whether it is in soft handoff, for example. The wireless communication system 800 can provide service over a large geographic region. In some aspects, some of the mobile devices 806, such as devices 806A, 806H, and 806J, may be femto nodes, such as nodes 102 or 202 or system 500, and may include the components and implement the functions described above with respect to FIGS. 1-5.

Figure 9:
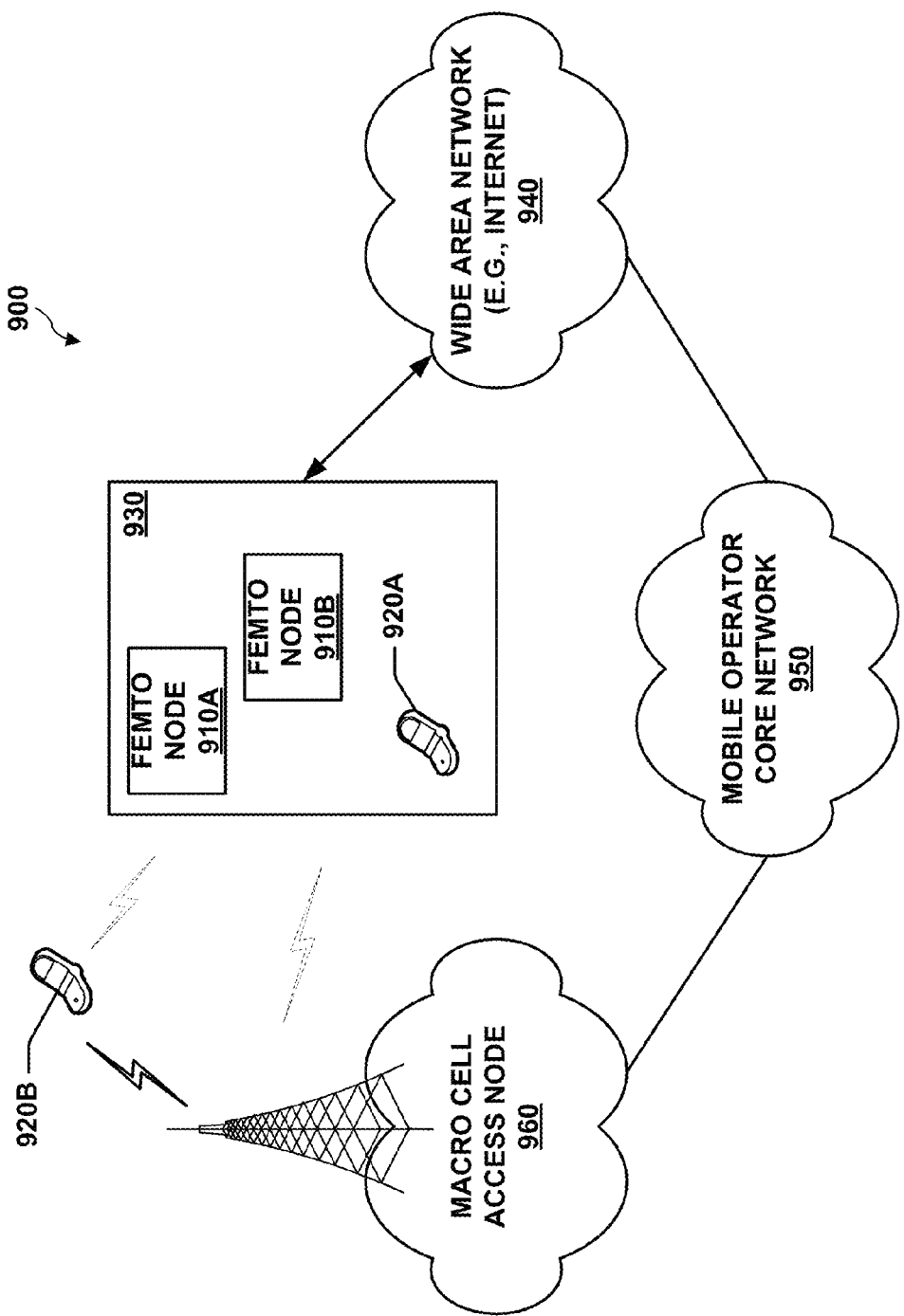
FIG. 9 is an illustration of an exemplary communication system to enable deployment of femtocells within a network environment.

FIG. 9 illustrates an exemplary communication system 900 where one or more femto nodes are deployed within a network environment. Specifically, the system 900 includes multiple femto nodes 910A and 910B (e.g., femtocell nodes or H(e)NB) installed in a relatively small scale network environment (e.g., in one or more user residences 930), which, in one aspect, may correspond to femto nodes 104, 106, 108, 110, and 112 of FIGS. 1-5. Each femto node 910 can be coupled to a wide area network 940 (e.g., the Internet) and a mobile operator core network 950 via a digital subscriber line (DSL) router, a cable modem, a wireless link, or other connectivity means (not shown). As will be discussed below, each femto node 910 can be configured to serve associated mobile devices 920 (e.g., mobile device 920A) and, optionally, alien mobile devices 920 (e.g., mobile device 920B). In other words, access to femto nodes 910 can be restricted such that a given mobile device 920 can be served by a set of designated (e.g., home) femto node(s) 910 but may not be served by any non-designated femto nodes 910 (e.g., a neighbor's femto node).

Figure 10:
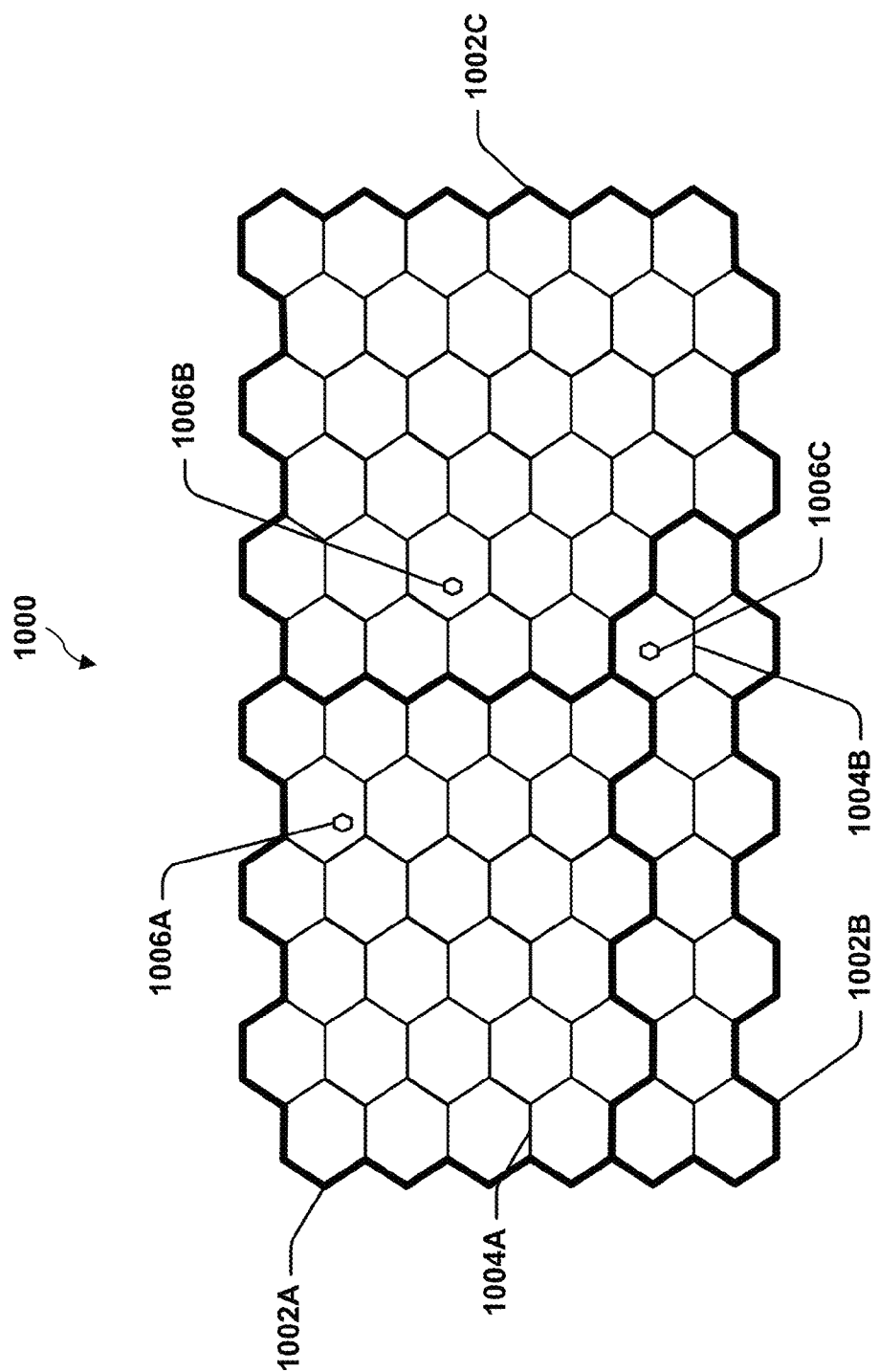
FIG. 10 illustrates an example of a coverage map having several defined tracking areas.

FIG. 10 illustrates an example of a coverage map 1000 where several tracking areas 1002 (or routing areas or location areas) are defined, each of which includes several macro coverage areas 1004. Here, areas of coverage associated with tracking areas 1002A, 1002B, and 1002C are delineated by the wide lines and the macro coverage areas 1004 are represented by the hexagons. The tracking areas 1002 also include femto coverage areas 1006 corresponding to respective femto nodes, such as nodes 102 or 202 or system 500, and which may include the components and implement the functions described above with respect to FIGS. 1-5. In this example, each of the femto coverage areas 1006 (e.g., femto coverage area 1006C) is depicted within a macro coverage area 1004 (e.g., macro coverage area 1004B). It should be appreciated, however, that a femto coverage area 1006 may not lie entirely within a macro coverage area 1004. In practice, a large number of femto coverage areas 1006 can be defined with a given tracking area 1002 or macro coverage area 1004. Also, one or more pico coverage areas (not shown) can be defined within a given tracking area 1002 or macro coverage area 1004.

Referring again to FIG. 9, the owner of a femto node 910 can subscribe to mobile service, such as, for example, 3G mobile service, offered through the mobile operator core network 950. In another example, the femto node 910 can be operated by the mobile operator core network 950 to expand coverage of the wireless network. In addition, a mobile device 920 can be capable of operating both in macro environments and in smaller scale (e.g., residential) network environments. Thus, for example, depending on the current location of the mobile device 920, the mobile device 920 can be served by a macro cell access node 960 or by any one of a set of femto nodes 910 (e.g., the femto nodes 910A and 910B that reside within a corresponding user residence 930). For example, when a subscriber is outside his home, he is served by a standard macro cell access node (e.g., node 960) and when the subscriber is at home, he is served by a femto node (e.g., node 910A). Here, it should be appreciated that a femto node 910 can be backward compatible with existing mobile devices 920.

A femto node 910 can be deployed on a single frequency or, in the alternative, on multiple frequencies. Depending on the particular configuration, the single frequency or one or more of the multiple frequencies can overlap with one or more frequencies used by a macro cell access node (e.g., node 960). In some aspects, an mobile device 920 can be configured to connect to a preferred femto node (e.g., the home femto node of the mobile device 920) whenever such connectivity is possible. For example, whenever the mobile device 920 is within the user's residence 930, it can communicate with the home femto node 910.

In some aspects, if the mobile device 920 operates within the mobile operator core network 950 but is not residing on its most preferred network (e.g., as defined in a preferred roaming list), the mobile device 920 can continue to search for the most preferred network (e.g., femto node 910) using a Better System Reselection (BSR), which can involve a periodic scanning of available systems to determine whether better systems are currently available, and subsequent efforts to associate with such preferred systems. Using an acquisition table entry (e.g., in a preferred roaming list), in one example, the mobile device 920 can limit the search for specific band and channel. For example, the search for the most preferred system can be repeated periodically. Upon discovery of a preferred femto node, such as femto node 910, the mobile device 920 selects the femto node 910 for camping within its coverage area.

A femto node can be restricted in some aspects. For example, a given femto node can only provide certain services to certain mobile devices. In deployments with so-called restricted (or closed) association, a given mobile device can only be served by the macro cell mobile network and a defined set of femto nodes (e.g., the femto nodes 910 that reside within the corresponding user residence 930). In some implementations, a femto node can be restricted to not provide, for at least one mobile device, at least one of: signaling, data access, registration, paging, or service.

In some aspects, a restricted femto node (which can also be referred to as a Closed Subscriber Group H(e)NB) is one that provides service to a restricted provisioned set of mobile devices. This set can be temporarily or permanently extended as necessary. In some aspects, a Closed Subscriber Group (CSG) can be defined as the set of access nodes (e.g., femto nodes) that share a common access control list of mobile devices. A channel on which all femto nodes (or all restricted femto nodes) in a region operate can be referred to as a femto channel.

Various relationships can thus exist between a given femto node and a given mobile device. For example, from the perspective of a mobile device, an open femto node can refer to a femto node with no restricted association. A restricted femto node can refer to a femto node that is restricted in some manner (e.g., restricted for association and/or registration). A home femto node can refer to a femto node on which the mobile device is authorized to access and operate on. A guest femto node can refer to a femto node on which a mobile device is temporarily authorized to access or operate on. An alien femto node can refer to a femto node on which the mobile device is not authorized to access or operate on, except for perhaps emergency situations (e.g., 911 calls).

From a restricted femto node perspective, a home mobile device can refer to an mobile device that authorized to access the restricted femto node. A guest mobile device can refer to a mobile device with temporary access to the restricted femto node. An alien mobile device can refer to a mobile device that does not have permission to access the restricted femto node, except for perhaps emergency situations, for example, 911 calls (e.g., an access terminal that does not have the credentials or permission to register with the restricted femto node).

For convenience, the disclosure herein describes various functionality in the context of a femto node. It should be appreciated, however, that a pico node can provide the same or similar functionality as a femto node, but for a larger coverage area. For example, a pico node can be restricted, a home pico node can be defined for a given mobile device, and so on.

A wireless multiple-access communication system can simultaneously support communication for multiple wireless mobile devices. As mentioned above, each terminal can communicate with one or more base stations via transmissions on the forward and reverse links. The forward link (or downlink) refers to the communication link from the base stations to the terminals, and the reverse link (or uplink) refers to the communication link from the terminals to the base stations. This communication link can be established via a single-in-single-out system, a MIMO system, or some other type of system.

The various illustrative logics, logical blocks, modules, components, and circuits described in connection with the embodiments disclosed herein may be implemented or performed with a general purpose processor, a digital signal processor (DSP), an application specific integrated circuit (ASIC), a field programmable gate array (FPGA) or other programmable logic device, discrete gate or transistor logic, discrete hardware components, or any combination thereof designed to perform the functions described herein. A general-purpose processor may be a microprocessor, but, in the alternative, the processor may be any conventional processor, controller, microcontroller, or state machine. A processor may also be implemented as a combination of computing devices, e.g., a combination of a DSP and a microprocessor, a plurality of microprocessors, one or more microprocessors in conjunction with a DSP core, or any other such configuration. Additionally, at least one processor may comprise one or more modules operable to perform one or more of the steps and/or actions described above. An exemplary storage medium may be coupled to the processor, such that the processor can read information from, and write information to, the storage medium. In the alternative, the storage medium may be integral to the processor. Further, in some aspects, the processor and the storage medium may reside in an ASIC. Additionally, the ASIC may reside in a user terminal. In the alternative, the processor and the storage medium may reside as discrete components in a user terminal.

In one or more aspects, the functions, methods, or algorithms described may be implemented in hardware, software, firmware, or any combination thereof. If implemented in software, the functions may be stored or transmitted as one or more instructions or code on a computer-readable medium, which may be incorporated into a computer program product. Computer-readable media includes both computer storage media and communication media including any medium that facilitates transfer of a computer program from one place to another. A storage medium may be any available media that can be accessed by a computer. By way of example, and not limitation, such computer-readable media can comprise RAM, ROM, EEPROM, CD-ROM or other optical disk storage, magnetic disk storage or other magnetic storage devices, or any other medium that can be used to carry or store desired program code in the form of instructions or data structures and that can be accessed by a computer. Also, substantially any connection may be termed a computer-readable medium. For example, if software is transmitted from a website, server, or other remote source using a coaxial cable, fiber optic cable, twisted pair, digital subscriber line (DSL), or wireless technologies such as infrared, radio, and microwave, then the coaxial cable, fiber optic cable, twisted pair, DSL, or wireless technologies such as infrared, radio, and microwave are included in the definition of medium. Disk and disc, as used herein, includes compact disc (CD), laser disc, optical disc, digital versatile disc (DVD), floppy disk and blu-ray disc where disks usually reproduce data magnetically, while discs usually reproduce data optically with lasers. Combinations of the above should also be included within the scope of computer-readable media.

As used in this application, the terms "component," "module," "system" and the like are intended to include a computer-related entity, such as but not limited to hardware, firmware, a combination of hardware and software, software, or software in execution. For example, a component may be, but is not limited to being, a process running on a processor, a processor, an object, an executable, a thread of execution, a program, and/or a computer. By way of illustration, both an application running on a computing device and the computing device can be a component. One or more components can reside within a process and/or thread of execution and a component may be localized on one computer and/or distributed between two or more computers. In addition, these components can execute from various computer readable media having various data structures stored thereon. The components may communicate by way of local and/or remote processes such as in accordance with a signal having one or more data packets, such as data from one component interacting with another component in a local system, distributed system, and/or across a network such as the Internet with other systems by way of the signal.

While the foregoing disclosure discusses illustrative aspects and/or embodiments, it should be noted that various changes and modifications could be made herein without departing from the scope of the described aspects and/or embodiments as defined by the appended claims. Furthermore, although elements of the described aspects and/or embodiments may be described or claimed in the singular, the plural is contemplated unless limitation to the singular is explicitly stated. Additionally, all or a portion of any aspect and/or embodiment may be utilized with all or a portion of any other aspect and/or embodiment, unless stated otherwise.

The invention claimed is:

1. A method for regulating wireless system reselection in a femtocell, comprising:
  detecting, by the femtocell, frequent system reselections from a macrocell to the femtocell by at least one mobile device operating in an idle mode;
  transmitting, by the femtocell, a reselection beacon at a transmission frequency based on the detected frequent system reselections; and
  controlling, by the femtocell, the frequent system reselections from the macrocell to the femtocell by concurrently increasing power of a pilot transmission of the femtocell that occurs with the transmitting of the reselection beacon.

2. The method of claim 1, further comprising:
  reducing a minimum signal quality criteria of the femtocell required for reselection by at least one mobile device to minimize a coverage area of the femtocell.

3. An apparatus for regulating wireless system reselection in a femtocell, comprising:
  a transmitter configured to detect, by the femtocell, frequent system reselections from a macrocell to the femtocell by at least one mobile device operating in an idle mode;
  the transmitter configured to transmit a reselection beacon by femtocell at a transmission frequency based on the detected frequent system reselections; and
  a power regulating component configured to control the frequent system reselections from the macrocell to the femtocell by concurrently increasing power of a pilot transmission of the femtocell that occurs with the transmission of the reselection beacon.

4. The apparatus of claim 3, wherein the power regulating component is further configured to:
reduce a minimum signal quality criteria of the femtocell required for reselection by at least one mobile device to minimize a coverage area of the femtocell.

5. A non-transitory computer-readable medium storing computer executable code for causing a computer to:
detect, by a femtocell, frequent system reselections from a macrocell to a femtocell by at least one mobile device operating in an idle mode;
transmit, by the femtocell, a reselection beacon at a transmission frequency based on the detected frequent system reselections; and
control the frequent system reselections from the macrocell to the femtocell by concurrently increasing power of a pilot transmission of the femtocell that occurs with the transmitting of the reselection beacon.

6. The non-transitory computer-readable medium of claim 5, wherein the stored computer executable code further causes the computer to:
adjust power of a pilot transmission of the femtocell to delay at least one mobile device from reselecting to the femtocell.

7. An apparatus for regulating wireless system reselection in a femtocell, comprising:
means for detecting, by the femtocell, frequent system reselections from a macrocell to the femtocell by at least one mobile device operating in an idle mode;
means for transmitting a reselection beacon by the femtocell at a transmission frequency based on the detected frequent system reselections; and
means for controlling the frequent system reselections from the macrocell to the femtocell by concurrently increasing power of a pilot transmission of the femtocell that occurs with the transmitting of the reselection beacon.

8. The apparatus of claim 7, further comprising:
means for adjusting power of a pilot transmission of the femtocell to delay at least one mobile device from reselecting to the femtocell.

* * * * *